United States Patent [19]

Petzinger

[11] 4,105,412

[45] Aug. 8, 1978

[54] PORTABLE COMPOST CONTAINER

[76] Inventor: Manfred W. A. Petzinger, Rte. 7, Box 87, Elizabethtown, Ky. 42701

[21] Appl. No.: 821,684

[22] Filed: Aug. 4, 1977

[51] Int. Cl.² ............................................. C05F 9/02
[52] U.S. Cl. ................................. 23/259.1; 71/64 JC; 71/14; 220/1 T; 220/441; 210/67; 195/144
[58] Field of Search ........................ 23/259.1; 71/5–15, 71/64 JC; 220/1 T, 17; 210/66–68; 195/139–144

[56] References Cited

U.S. PATENT DOCUMENTS

| 387,104 | 7/1888 | Paynter | 71/14 X |
| 1,595,445 | 8/1926 | Boggiano-Pico | 23/259.1 X |
| 2,535,627 | 12/1950 | Earp-Thomas | 71/9 X |

Primary Examiner—James H. Tayman, Jr.
Attorney, Agent, or Firm—Thomas O. Maser

[57] ABSTRACT

A portable compost container including a base section for receiving fertilizer sap and having outlet means to draw off the sap therefrom. A perforate inner section is supported by the base section into which decomposable garbage and waste is placed, the perforate section having access means to permit removal of compost from the lower portion thereof. An imperforate section is placed over the perforate section and is supported by the base section, the imperforate section being removable for ready access to the perforate inner section. A lid covers the container.

7 Claims, 7 Drawing Figures

PORTABLE COMPOST CONTAINER

CROSS-REFERENCE TO RELATED APPLICATION

This invention is related to co-pending U.S. application Ser. No. 821,849, filed Aug. 4, 1977, by the same inventor.

BACKGROUND OF INVENTION

It is common practice to use decomposable garbage or waste for making compost and fertilizer sap for use in gardens and the like. For this purpose, the decomposable garbage and waste is placed in a pile on the ground and is moistened with water to aid the fermenting process. Since the fermenting process takes approximately three or four months and the pile is usually in an exposed area, problems can occur as a result of the unsightliness of the pile and the possibility that it will attract animals and rodents.

SUMMARY OF THE INVENTION

The present invention relates to a portable compost container into which the decomposable garbage and waste material is placed, which materials are completely covered and capable of being transported from one area to another if desired.

The container includes a base section for receiving the fertilizer sap from the decomposing materials which base section supports a perforate inner cylindrical section in which the decomposable garbage and waste is placed. The container further includes a removable imperforate outer cylindrical section which is placed over the inner section in spaced relation to the peripheral wall thereof. The whole container is covered by a removable lid so that access to the inner section for the purpose of adding garbage or waste thereto is effected by simply lifting the lid from the container.

When it is desired to remove compost from the inner section, the outer section is simply lifted from the inner section to expose an access door or opening through which the compost may be removed from the inner section. The base section is provided with valve means to permit fertilizer sap to be removed therefrom when desired.

DESCRIPTION OF THE FORM OF INVENTION ILLUSTRATED IN FIGS. 1 TO 3

Figure 1:
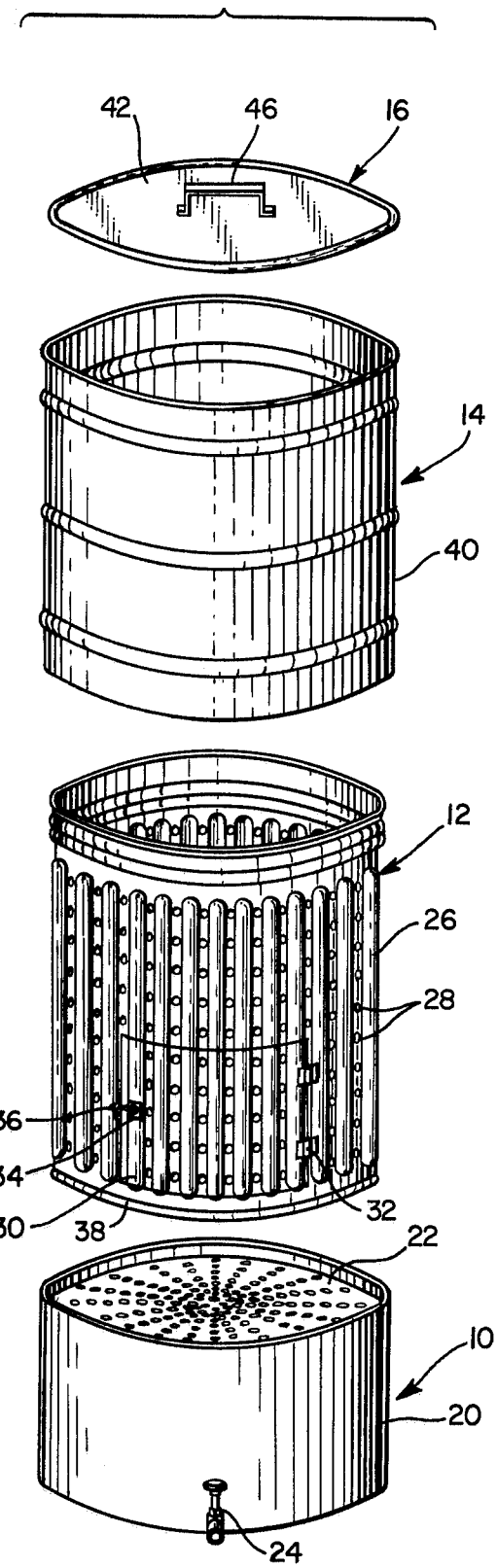
FIG. 1 is an exploded elevational view of the compost container of the present invention.
Figure 2:
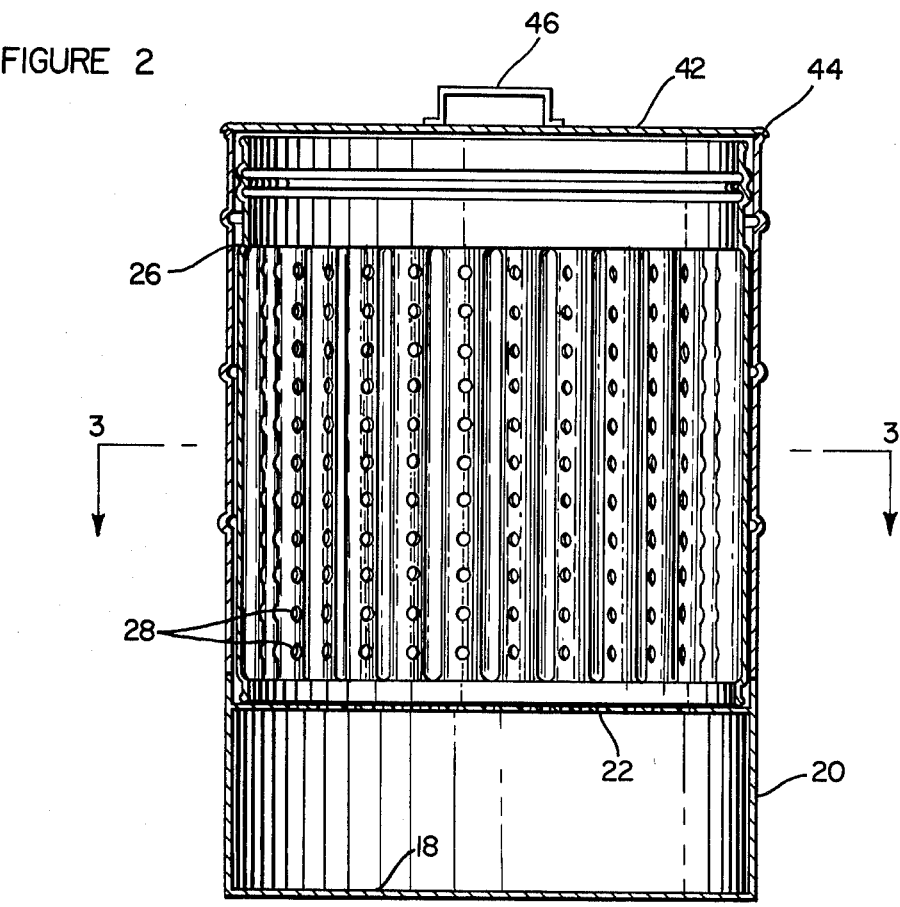
FIG. 2 is a side elevational view of the compost container of the present invention, portions thereof being shown in section.
Figure 3:
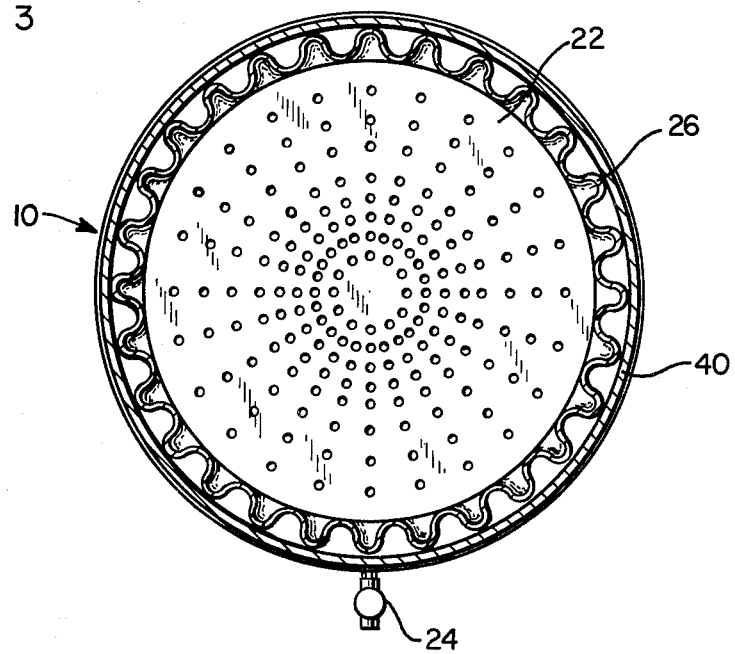
FIG. 3 is a sectional view taken along the line 3—3 of FIG. 2 looking in the direction of the arrow.

In FIGS. 1 to 3 is illustrated a compost container which includes a base section 10 which supports an inner perforate section 12 and an outer imperforate section 14. A lid 16 is placed over the outer imperforate section 14 to close the portable container.

Base section 10 includes a circular bottom wall 18 to the peripheral edge of which is fixed a cylindrical side wall 20 to form a housing for receiving fertilizer sap. A perforate support disc 22 is mounted within cylindrical side wall 20 in spaced relation to both the upper and lower limits thereof, but in closer proximity to the top of the base section. A valve 24, of conventional construction, mounted in cylindrical side wall 20 proximate bottom wall 18, permits sap fertilizer within the base section to be readily drawn off when desired.

Inner perforate section 12 includes a cylindrical member 26 having a plurality of perforations 28, the side wall of the member preferably being corrugated for added strength and open at the top and bottom.

As shown in FIG. 1, at a point adjacent to the lower end of cylindrical member 26, and integrally formed therewith, there is provided a perforate door 30. Door 30 is hingedly engaged with the cylindrical member as indicated at 32 and the opposite side of the door is provided with latch means 34 of any suitable type which is engaged by a keeper 36 carried by cylindrical member 26. As shown to advantage in FIG. 2, cylindrical member 26 fits within the upper portion of base section 10, the lower portion of cylindrical member 26 terminating in a circular flange 38 which rests on perforate disc 22.

Outer imperforate section 14 includes a cylindrical member 40 which may be similar in construction to a trash can with the bottom removed therefrom, the lowermost portion of which cylindrical member is supported by perforate disc 22. The peripheral wall of cylindrical member 40 is in spaced relation to inner perforate section 12 and may be readily removed and replaced on base 10.

Lid 16 includes a circular disc 42 provided at the outer periphery thereof with an annular recess 44 for positioning on the top circular edge of outer imperforate section 12. A handle 46 is centrally secured to disc 40 to facilitate removal and replacement of lid 16.

In use of the portable compost container of the present invention, inner perforate section 12 is placed on base section 10 and outer imperforate section 14 is placed thereover. Moistened garbage and waste is then placed in perforate section 12 and lid 16 placed over the container. Garbage and waste is added periodically to the container by removing lid 16 and depositing the same in inner section 12. As the garbage and waste decomposes, compost is formed and the fertilizer sap gravitates through the perforations of perforate disc 22 into the bottom of base section 10.

The fertilizer sap is readily removed when desired by actuating valve 24 to draw off the sap into a container for use.

When it is desired to remove compost from the container, lid 16 and outer imperforate section 14 are removed, following which latching means 34 is disengaged from keeper 36 and door 30 is swung open to permit removal of the compost from inner section 12.

After the compost is removed, the door is closed and latch means 34 engaged with the keeper 36, following which outer imperforate 14 and lid 16 are replaced.

DESCRIPTION OF THE FORM OF INVENTION ILLUSTRATED IN FIGS. 4 AND 5

Figure 4:
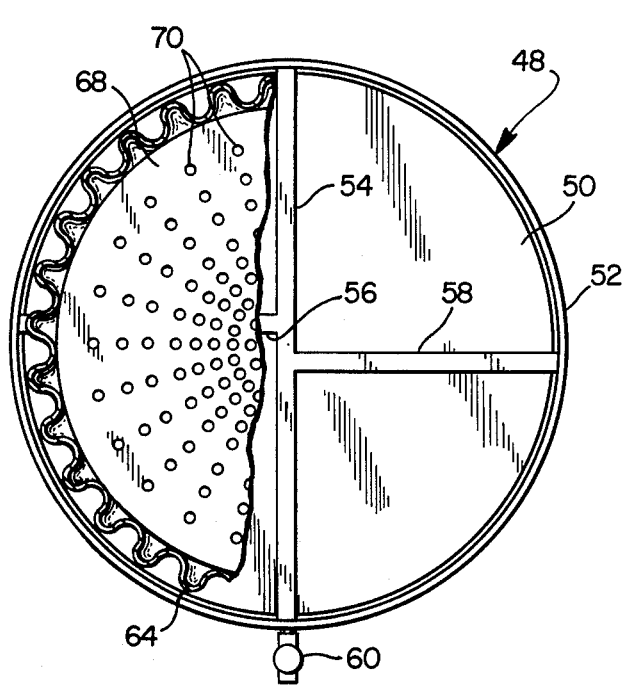
FIG. 4 is a top plan view of the base section and inner section of a modified form of compost container, portions thereof being broken away to disclose details of construction.
Figure 5:
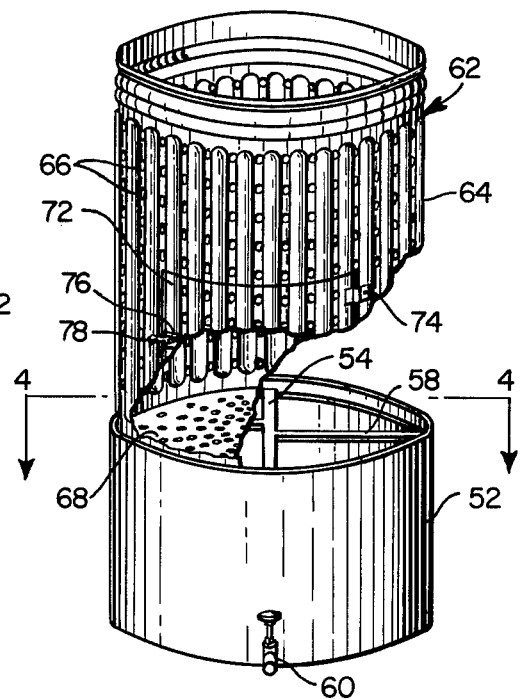
FIG. 5 is a fragmentary side elevational view of the form of invention illustrated in FIG. 4, a portion thereof being broken away to disclose details of construction.

In FIGS. 4 and 5 there is illustrated a modified form of the present invention which is basically similar to that form of the invention illustrated in FIGS. 1 to 3.

In this form of the invention, however, base section 48 includes a bottom wall 50 and a cylindrical side wall 52. A support bar 54 extends diametrically across the top of the base section and the ends thereof are secured in any suitable fashion to cylindrical side wall 52. Auxiliary support bars 56 and 58 extend between support bar 54 and opposite sides of cylindrical side wall 52. A valve for drawing off fertilizer sap is indicated at 60.

In this form of the invention, also, inner perforate section 62 includes a cylindrical member 64 having a plurality of perforations 66. In contrast to the form of invention illustrated in FIGS. 1 to 3, however, cylindrical member 64 is provided with a bottom wall 68 having a plurality of perforations 70.

A perforate door 72 is integrally formed with the lower portion of cylindrical member 64. Door 72 is hingedly engaged with the cylindrical member as indicated at 74 and the opposite side of the door is provided with latch means 76 which is engaged by a keeper 78 carried by cylindrical member 64.

In this form of the invention, an outer imperforate section and lid similar to that shown in the form of invention illustrated in FIGS. 1 to 3, may be employed, the use of the present modified form of container is the same as that of the main form of the invention.

DESCRIPTION OF THE FORM OF INVENTION ILLUSTRATED IN FIGS. 6 AND 7

Figure 6:
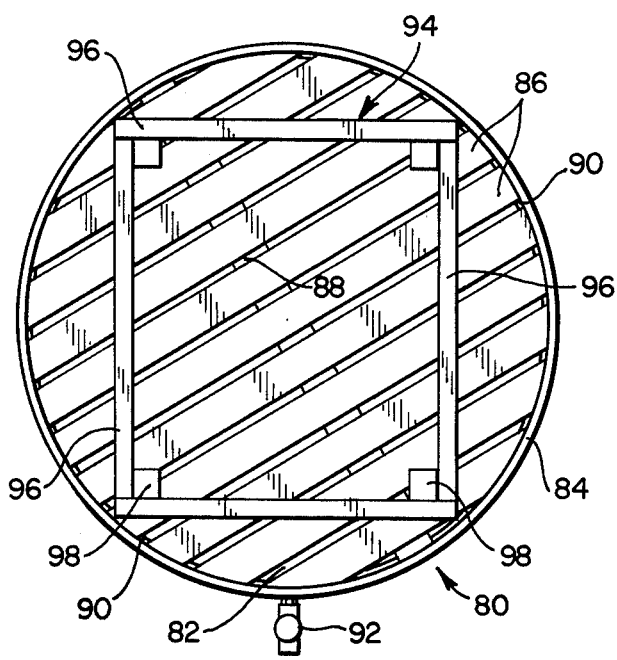
FIG. 6 is a top plan view of the base section and inner section of another modified form of compost container.
Figure 7:
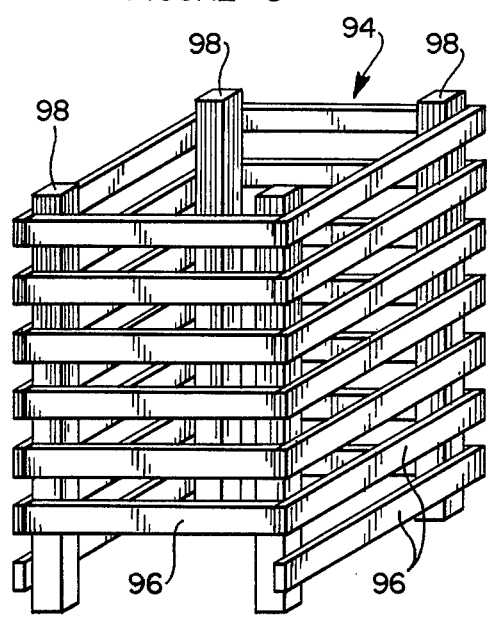
FIG. 7 is a side elevational view of the inner section of the form of compost container illustrated in FIG. 6.

In FIGS. 6 and 7 there is illustrated another modified form of the present invention which is basically similar to the form of invention illustrated in FIGS. 1 to 3.

In this form of the invention, base section 80 includes a bottom 82 and a cylindrical side wall 84. A plurality of boards 86 which are preferably of 5 cms. by 5 cms. in size and spaced 1 to 2 centimeters apart are parallelly arranged as shown in FIG. 6, which boards are centrally supported by a member 88 placed beneath the same. If desired, the ends of the boards may be engaged with an annular supporting flange 90 extending internally of cylindrical side wall 84 of base section 80. A valve for drawing off sap fertilizer is indicated at 92.

The inner section of the container into which the garbage and waste are placed is indicated at 94 and comprises a wooden boxlike rack having four sides, each side including spaced, parallel boards 96 which are connected to upstanding vertical posts 98 which are located at the internal corners of the rack. The lowermost horizontal board of the rack on one or more sides is preferably eliminated in order to permit access to the interior of the wood rack for removing compost therefrom.

The portable compost container of the present invention provides economic and efficient means for holding disposable garbage or waste material in a small area for the purpose of making compost, wherein the garbage and waste material are covered at all times and wherein the sap fertilizer is maintained within the base section container until use is desired.

While there has been herein shown and described the presently preferred forms of this invention, it is to be understood that such has been done for purposes of illustration only, and that various changes may be made within the scope of the appended claims.

What is claimed is:

1. A compost container including:
 (a) a base section providing a housing for receiving liquid fertilizer sap,
 (b) support means within and on the upper portion of said base section,
 (c) container means, including an inner perforate section into which decomposable garbage and waste is placed and an outer imperforate section removably placed over said perforate section, removably positioned on said support means whereby compost is formed in said container, said inner perforate section including access means near the lower portion thereof for removing compost therefrom, and
 (d) at least a portion of the lower portion of said container means being open to permit liquid fertilizer sap to gravitate from said container means with said base section.

2. The compost container of claim 1, wherein:
 (a) said base section includes a bottom wall and a wall extending upwardly from the peripheral edge of said bottom wall, and
 (b) valve means mounted in said wall for drawing off liquid fertilizer stored in said base section.

3. The compost container of claim 1, wherein:
 (a) said support means includes a perforate dishlike member on which said container means rests.

4. The compost container of claim 1, wherein:
 (a) said support means includes bar means extending between the sides of said base section,
 (b) said container means including a perforate bottom wall through which the liquid fertilizer gravitates into said base section.

5. The compost container of claim 1, wherein:
 (a) said support means includes a plurality of closely spaced members extending between opposed sides of said wall.

6. The compost container of claim 1, wherein:
 (a) said access means comprises a door.

7. The compost container of claim 1, wherein:
 (a) said container means comprises a rack positioned on said base section, and an outer member placed over said rack.

* * * * *